United States Patent [19]

Seitz

[11] 3,763,365

[45] Oct. 2, 1973

[54] COMPUTER GRAPHICS MATRIX MULTIPLIER

[75] Inventor: Charles L. Seitz, Salt Lake City, Utah

[73] Assignee: Evans & Sutherland Computer Corporation, Salt Lake City, Utah

[22] Filed: Jan. 21, 1972

[21] Appl. No.: 219,720

[52] U.S. Cl. .................................. 235/156, 235/151
[51] Int. Cl. .................................................. G06f 7/39
[58] Field of Search .................... 235/156, 164, 159, 235/160, 151

[56] References Cited

UNITED STATES PATENTS

| | | | |
|---|---|---|---|
| 3,535,694 | 10/1970 | Anacker et al. | 235/164 X |
| 3,684,876 | 8/1972 | Sutherland | 235/152 |
| 3,277,449 | 10/1966 | Shooman | 340/172.5 |

OTHER PUBLICATIONS

I. De Lotto & R. Galimberti, "Innovative Design with Computer Graphics" (C.I.S.E. Laboratories & Instituto di Elettrotecnicu ed Elettronica del Palitecnico, Milano, Italy) April 18, 1967.

*Primary Examiner*—Felix D. Gruber
*Assistant Examiner*—David H. Malzahn
*Attorney*—Nilsson, Robbins, Wills & Berliner

[57] ABSTRACT

A matrix multiplier is disclosed for rotating, translating, and scaling multi-dimensional drawing definitions (vectors), the system having particular applicability to the field of computer graphics. The multiplier registers an additional dimension over that of the vectors undergoing computation, whereby to accomplish both the transformations of translation and rotation. Specifically, a multiplier is disclosed to accommodate a four-by-four matrix for use in three-dimensional transformations. Furthermore, the multiplier incorporates a cubic-array register for registering plural matrices as a push down stack, along with structure for variously delivering elements therefrom. Individual matrices may be multiplied to provide composite transformations. The system also incorporates structure for providing curve and surface information by iterating difference equations.

10 Claims, 7 Drawing Figures

COMPUTER GRAPHICS MATRIX MULTIPLIER

BACKGROUND AND SUMMARY OF THE INVENTION

Improvements in the speed and accuracy of modern electronic computing components have enabled the expansion of computer techniques to encompass many fresh applications. For example, the field of computer graphics involves the application of computer technology for developing visual images that may be physically non-existent and which may change, as in real time, in accordance with varying input signals or other criteria. In accordance with one class of systems, visual images are defined by sets of rectangular-coordinate points. In such systems, the occasion frequently arises when a large number of coordinate points must be very rapidly transformed to accomplish a change as, for example, in the location of observation. The transformation of a point may involve rotation of the point (about a reference location) and/or translation of the point, which involves displacement in the coordinate system. Of course, the transformation (rotation and/or translation) of a substantial number of points as normally define an image, requires substantial computation. Accordingly, a need exists for a rapid and economical structure for accomplishing transformations in a computer graphics system.

As a further complexity, in processing large volumes of data representing visual images, the need frequently occurs to perform composite or multiple transformations. For example, a display may include flying helicopters, in which the relationship of the viewer to the scene is defined by a first transformation. The positions and orientations of each of the helicopters with respect to the scene are then specified by additional transformations. To compute the relationship between the helicopter and the observer, it is necessary to concatenate the several transformations in application to each defined point (vector) in the image. Further processing is necessary to display the revolving rotors on each helicopter. The position of each of the rotors may be specified with respect to the reference axes of the helicopters and again concatenation allows computation of the position of each rotor from the viewpoint of the observer. Thus, a prodigious volume of computation is required, and of course, if the display is in real time, the computation must be accomplished in a very short interval.

Another facility for computation that is particularly applicable in the field of computer graphics involves the iteration of sets of difference equations, as to define curves or surfaces by short line segments. The matrix multiplier hereof incorporates means for accomplishing such computation.

In general, the system hereof incorporates a memory configuration for registering a plurality of matrices which incorporates a dimension in addition to the dimension of computation. The system also incorporates means for effectively performing concatenation operations. The system further includes structure for manipulating the matrices as a push-down stack and furthermore, the system incorporates means for manipulating vectors and performing operations thereon to define curves and surfaces by the technique of difference equations.

BRIEF DESCRIPTION OF THE DRAWINGS

In the drawings, which constitute a part of this specification, embodiments are illustrated demonstrating various objectives and features hereof, specifically.

DETAILED DESCRIPTION OF THE ILLUSTRATIVE EMBODIMENT

Figure 1:
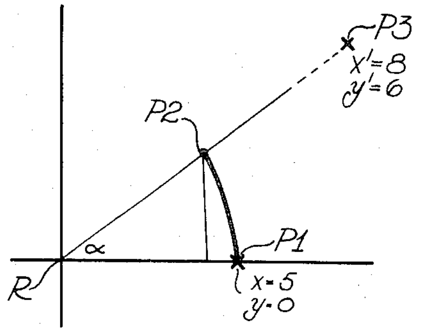
FIG. 1 is a graph illustrative of an operation which may be performed by a system of the present invention.

As explained and considered above, the need frequently arises in the field of computer graphics to revolve a large number of points (defining an image) about their location of origin and/or translate them with respect thereto, which operations are generically termed transformations. Considering a single point as a specific example, reference will now be made to FIG. 1, showing a rectangular-coordinate plot. Assume the desire to revolve a point P1 through an angle $\alpha$ to the location of a point P2, then further, to translate the point to the location of a point P3 by adding displacements of an $x$ increment of 4 and a $y$ increment of 3. That is, in the assumed example, the point P1 is to be rotated about the reference location R by an angle of $\alpha$ to the point P2, then translated to the point P3 ($x = 8$, $y = 6$).

The illustration of FIG. 1 is a vastly-simplified case involving two-dimension translation and rotation of a single coordinate point and serves simply for disclosure compliance. In fact, the system hereof is particularly applicable to three-dimensional displays as described in detail below and normally a multitude of vectors would be transformed, rather than a single point. However, the elemental operation analytically illustrated in FIG. 1 serves to explain a fundamental operation of the system.

Recapitulating, although the stated operations to transform a vector specifying the point P1 to a vector specifying the point P3 involve a rotation through the angle $\alpha$ coupled with a translation of $\Delta x = 4$ and $\Delta y = 3$; analytically the change simply involves movement of the point P1 (specified as $x = 5$ and $y = 0$) to the point P3 (specified as $x = 8$ and $y = 6$).

Preliminarily considering the mathematical operations as utilized, a two-dimensional transformation may be presented as a matrix:

$$\begin{bmatrix} \cos\alpha & \sin\alpha & 0 \\ -\sin\alpha & \cos\alpha & 0 \\ Tx & Ty & 1 \end{bmatrix}$$

The application of the above matrix rotates a point about is origin by an angle $\alpha$ and translates the point with reference to its origin (in coordinates X and Y) by $Tx$ and $Ty$. The vector specifying the point also may be scaled simply by multiplying the 2 × 2 trigonometric submatrix of sines and cosines (upper left) by a predetermined constant. A point of some significance to the structure as described hereinafter, is that the 2 × 2 trigonometric submatrix consists of fractional values, while the values $Tx$ and $Ty$ are integers.

Generally as described herein, a point (which is to be transformed) is specified as a vector in terms of $x$, $y$, and either 1 or 0. That is, in the illustrative two-dimensional mode, each complete data item consists of two numbers, $x$ and $y$, which are augmented by an internally generated third element to form a three-element row vector. If the data is absolute, the vector is: $[x, y, 1]$. If the data is relative, the vector is: $[x, y, 0]$.

To accomplish a combination translation-and-rotation transformation, a vector definitive of a point $[x, y, 1 \text{ or } 0]$ is multiplied by the transformation matrix. Specifically:

$$[x, y, w] \cdot \begin{bmatrix} \cos\alpha & \sin\alpha & 0 \\ -\sin\alpha & \cos\alpha & 0 \\ Tx & Ty & 1 \end{bmatrix} = [x', y', w']$$

As represented in FIG. 1, the vector specifying the coordinate point P1 is [5, 0, 1]. The cosine of the angle $\alpha$ is 4/5 while the sine of the angle is 3/5. Inserting the values analytically depicted in FIG. 1 into the above transformation equation results in:

$$[5, 0, 1] \cdot \begin{bmatrix} 4/5 & 3/5 & 0 \\ -3/5 & 4/5 & 0 \\ 4 & 3 & 1 \end{bmatrix} = [x', y', w']$$

Multiplying the vector and the matrix provides the transformed values, as follows:

$$x' = 4 + 0 = 4 = 8$$

$$y' = 3 + 0 + 3 = 6$$

$$w' = 0 + 0 + 1 = 1$$

Thus, the point P3 is defined by the rectangular coordinate values $x' = 8$, $y' = 6$ and $w' = 1$ as indicated above and analytically illustrated in FIG. 1. It is, thus, apparent that a single matrix multiplication of the vector enables the dual transformations of translation and rotation. Generally, the system hereof functions to accomplish such transformations by providing the facility to compute matrices of one-dimension greater than the dimension of computation. Thus, in the above example, for two-dimensional computations, three dimensional matrices were utilized. Similarly, for three-dimensional computation, four-dimensional matrices are utilized.

The structure enabling combined transformations affords a powerful element in combination with other components. For example, a component disclosed in a paper entitled "A Clipping Divider" presented at the Fall Joint Computer Conference (1968) and published in AFIPS Conference Proceedings, Volume 33 by Thompson Book Company, Washington, D. C., may be combined with the present structure to accomplish perspective views of three-dimensional objects tumbling in real time.

Considering an application of the present system in greater detail, a matrix multiplier 18 (FIG. 2) in accordance herewith may be placed between a computer unit 20 and a viewing system 22, which may include a clipping divider as disclosed in the above-referenced paper. The computer unit 20 also is connected to a memory 26 and an input-output unit 28. The computer unit 20, the associated memory 26 and the input-output unit 28, as well as the viewing system 22 may take any of a variety of well known forms.

Figure 2:
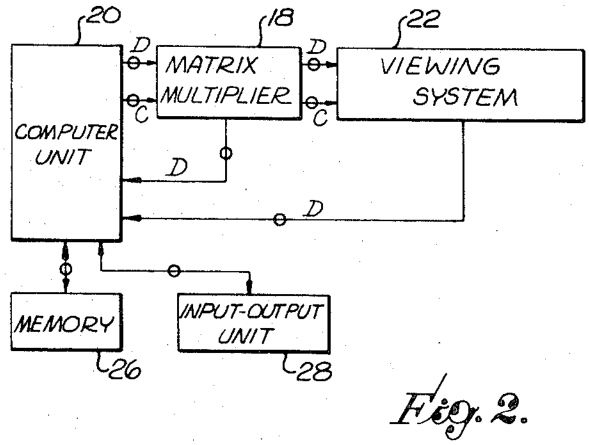
FIG. 2 is a block diagram of a system including as a component, the matrix multiplier hereof.

The units as shown in FIG. 2 are indicated to be connected by several cables which are individually designated by the letters D and C. The cables C indicate control paths while the cables D indicate data-flow paths. Generally, the matrix multiplier 18 receives input signals from the computer unit 20 and delivers processed output signals to the viewing system 22 or to the memory 26 through the computer 20. When the matrix multiplier 18 is active, each coordinate point is multiplied by a matrix that is held in the multiplier 18. For example, in three-dimensional operation, a vector, representing a coordinate point, is multiplied by a matrix representing a transformation as follows:

$$[x, y, z, w] \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} = [x', y', z', w']$$

Note, the actual multiplication is:

$$a_{11}x + a_{21}y + a_{31}z + a_{41}x = x'$$

$$a_{12}x + a_{22}y + a_{32}z + a_{42}w = y'$$

$$a_{13}x + a_{23}y + a_{33}z + a_{43}w = z'$$

$$a_{14}x + a_{24}y + a_{34}z + a_{44}w = w'$$

Figure 3:
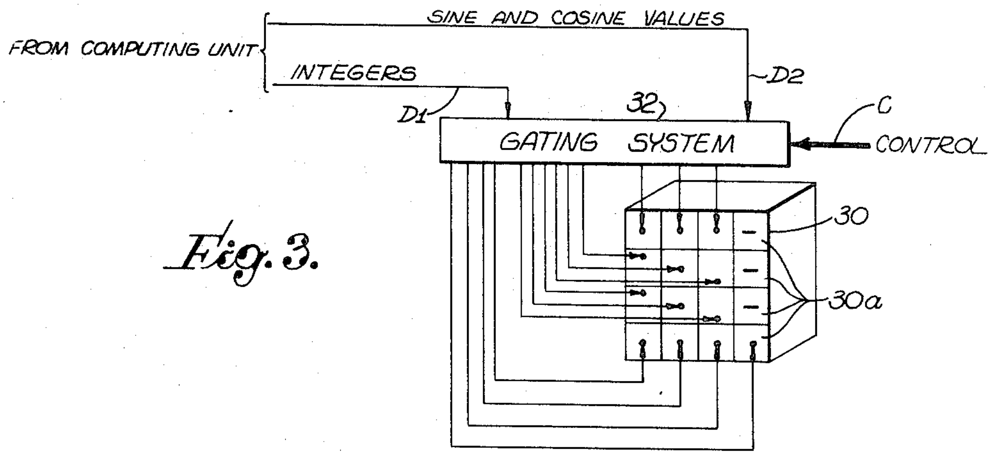
FIG. 3 is a detailed block diagram illustrating a loading structure portion of the matrix multiplier of FIG. 2.

Considering a single exemplary plane (FIG. 3) of rows and columns in a matrix register 30 (cubic array) of the multiplier 18, (FIG. 2) loading structure is illustrated. The single plane 30 of registers contains the elements of a four-by-four matrix in component registers 30*a*. As indicated in FIG. 3, each of the separate registers 30*a* is accessible through a gating system 32 which is connected to receive data through data lines D2 and D1 from the computer unit 20 under control of signals carried in a control line C.

Generally, as well known in the prior art, the gating system 32 enters the signal-represented vector elements in the individual registers 30*a*. Subsequently, as described in somewhat greater detail below, the registers 30a supply signal-represented values for multiplication. The units for such multiplication may utilize fraction-arithmetic structure, which requires that one of the numbers involved in each multiplication be a fraction. However, in the system hereof, such a limitation is accommodated. That is, the operating matrices are composed of a submatrix (upper left above) for accomplishing rotation (the components of which are the trigonometric fractions) and a vector for accomplishing translation, the components of which are integers. Considering a three-dimensional operation (involving a four-dimensional matrix) the matrix may involve elements as indicated below wherein the letters $r$ designate rotational elements and the letters $t$ represent translation elements. As the rotational elements $r$ are fractions and the translational elements $t$ are integers, the matrix takes a form of fractions and integers as represented by the letters $F$ (fraction) and $I$ (integer).

$$\begin{bmatrix} r_{11} & r_{12} & r_{13} & 0 \\ r_{21} & r_{22} & r_{23} & 0 \\ r_{31} & r_{32} & r_{33} & 0 \\ tx & ty & tz & s \end{bmatrix} = \begin{bmatrix} F & F & F & 0 \\ F & F & F & 0 \\ F & F & F & 0 \\ I & I & I & F \end{bmatrix}$$

As shown, the form of the transformation is homogeneous, the elements r comprising a rotation matrix and the elements t defining the displacement in three-dimension space. Generally, as the elements of the rotation matrix ($r$) are the products of sines and cosines, each is a fraction. The translation elements may be thought of as integers. Note that the element $s$ is a fraction which may be employed to scale the figure. In the multiplication of matrices in the form identified above, the homogeneous vectors conventionally will take the form: $[x, y, z, w] = [I, I, I, F]$. Consequently, in the multiplication of a vector by a matrix, each component or elemental multiplication involves a fraction and in that manner, as indicated, two's complement multiplication structure may be employed as well known.

Figure 4:
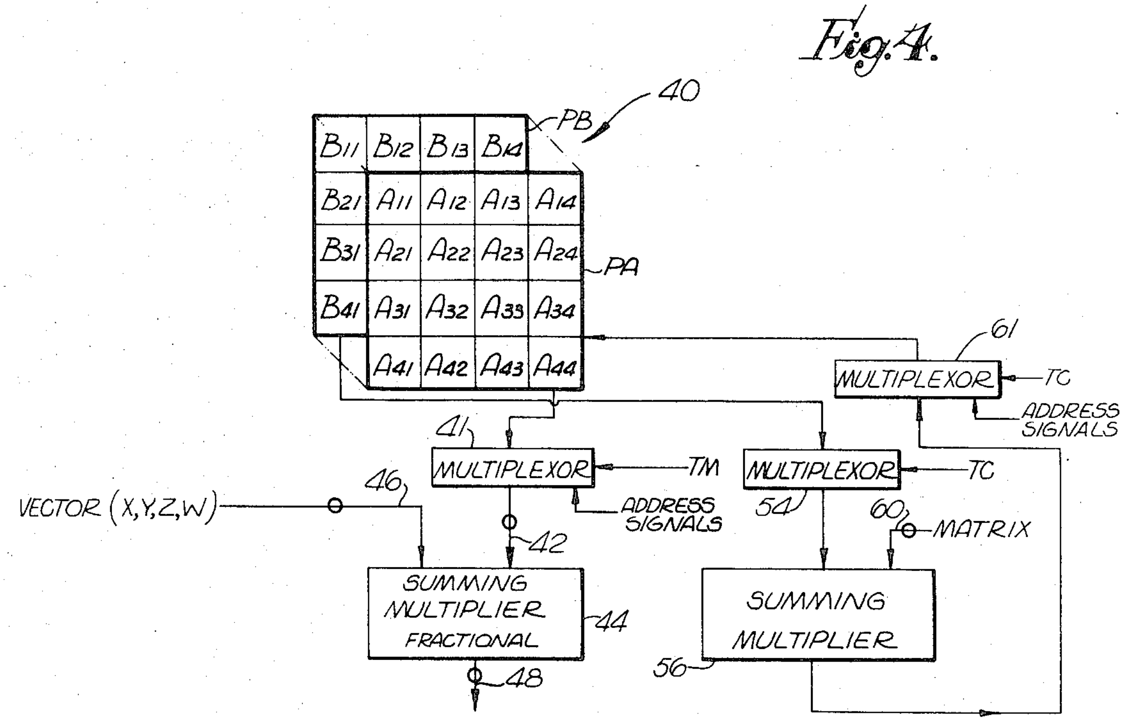
FIG. 4 is a block diagram illustrating a multiplying portion of the system of FIG. 2 in greater detail.

The matrix register 40 (FIG. 4) includes planes PA and PB, each of which may consist of a plane register 30 as illustrated in FIG. 3. The planes are sources of signal-represented matrices as considered above, for multiplication, which may also be provided from the computer unit 20 (FIG. 2). Each of the memory planes PA and PB may register a four-by-four matrix including a total of sixteen elements. The individual elements and elemental registration locations are both designated by a letter A or B (indicative of the plane) with a numerical subscript (indicative of the plane position).

The plane PA of the matrix register 40 is connected through a multiplexor 41 and a cable 42 to a summing multiplier 44. The multiplier 44 is also connected to receive signal-represented vectors $[x, y, z, w]$ from the computer unit 20 (FIG. 2) through a cable 46. Functionally, the multiplier 44 multiplies the vector received through a cable 46 and the matrix received through the cable 42, providing representative product signals. The computer unit 20 (FIG. 2) provides the vector elements to the cable 46 in a predetermined order in accordance with the multiplication format, and the multiplexor 41 functions, as well known, to similarly provide the elements of the matrix from the plane PA. The multiplexor 41 is actuated by a timing signal TM which is provided by the computer unit 20.

In one mode of operation a series of accumulated multiplications are performed. Specifically, the vector elements $A_{11}$, $A_{21}$, $A_{31}$, and $A_{41}$ are provided to the multiplier 44 in synchronism with signals representative of the vector elements $x, y, z$ and $w$; each pair being multiplied and accumulated as a sum that develops the transformed value $x'$. Next, the element $y'$ is developed by accumulating products of the signal-represented values: $A_{12}x + A_{22}y + A_{32}z + A_{42}w$, after which the transformed elements $z'$ and $w'$ are similarly developed as two accumulated values:

$$z' = A_{13}x + A_{23}y + A_{33}z + A_{43}w;$$

and $$W' = A_{14}x + A_{24}y + A_{34}z + A_{44}w.$$

The signal-represented quantities $x'$, $y'$, $z'$ and $w'$, thus developed, manifest the transformed vector and are provided in an output cable 48, which is connected to the viewing system 22 (FIG. 2) and/or the computer unit 20.

Summarizing, it may be seen that when the matrix multiplier 18 (FIG. 2) is active to accomplish a transformation, each coordinate point (vector) is multiplied by the matrix contained in the plane PA (FIG. 4) to result in signals defining a transformed point. Thus, as described above with reference to a two-dimensional array, wherein actual numerical values were employed with reference to FIG. 1, the coordinate points are revolved and translated to accomplish the desired total transformation in accordance with the principles of the present invention. Thus, the system may be very effectively employed to economically accomplish a multitude of coordinate point transformations in a short interval of time. Again, the distinctive structure enabling that capability resides in the capability for registering and manipulating an additional dimension.

The system hereof also has the capability to concatenate two transformations into a composite transformation. In that regard, as indicated above, it is sometimes necessary to impose a matrix-defined transformation on a substructure within a display, while allowing the entire drawing including the substructure to be similarly transformed. This requires that each coordinate point be multiplied by a matrix $[T1]$ which defines the relationship of the substructure to the drawing, after which the result must be multiplied by another matrix $[T0]$ defining the relation of the drawing to the viewer. Accordingly, the transformation for each coordinate point becomes:

$$[x, y, z, w] \cdot [T1] \cdot [T0] \rightarrow [x', y', z', w']$$

Rather than generating intermediate sets of values for each coordinate point, by the computation: $[x, y, z, w] \cdot [T1]$, and subsequently multiplying that result by $[T0]$, the multiplier hereof has the capability to develop the composite transformation, as the product of $[T1] \cdot [T0]$. The application of that composite to a multitude of coordinate points then greatly reduces the required volume of computation. As the formation of composite transformations generalizes to any level, in that various numbers of matrix products may be required, the system incorporates structure for manipulating such products in the form of matrices in a push-down stack, thus allowing a subroutine structure of the display to be employed which is, patterned after the symbol structure of the drawing.

The illustrative system operates to concatenate two transformations which are then registered in a single matrix plane. Specifically, a signal-represented matrix from the plane PB (FIG. 4) is applied (element by element) through a multiplexor 54 (as previously described) to a summing multiplier 56. The multiplier 56 may be combined with the multiplier 44 in an operating embodiment of the system; however, for illustrative purposes in the disclosure, two separate multipliers are indicated.

The multiplexor 54 (computer controlled) selectively applies the signal-represented matrix elements from the addressed source plane PB to the multiplier 56 in accordance with the multiplication format. Similar elements of another matrix are supplied through a cable 60 from the computer unit 20. Consequently, as disclosed above, the individual multiplications are accumulated and a concatenated matrix is developed for which representative signals are supplied through a multiplexor 61 to be registered in the plane PA. The multiplexor 61 is rendered operative, along with a multiplexor 54 by a timing signal TC provided from the computer unit 20 which signal commands the operation to concatenate the two selected individual transformation matrices. Thus, concatenated matrices may be developed and registered in the matrix register to effect a considerable reduction in the volume of computation required in accomplishing multiple transformations on a large number of individual vectors.

In addition to the above functions of the matrix multiplier, structure for accomplishing another operation is provided, which again is particularly useful with regard to computer-graphics applications. Essentially, the structure includes an iterative control unit 90 (FIG. 5) to operate in cooperation with the multiplier 44 and the expanded matrix register 50 so as to iterate a set of difference equations, as for drawing curves and surfaces composed of short line segments. Preliminary to considering the iterative control unit 90 in detail, some preliminary explanation of the mathematical operations involved will be provided.

Assume, for example, the desire to define a length of the curve indicated by an arbitrarily-selected illustrative equation $x^3 - x^2 = y$. Applying a series of independent variables $x$ (from an initial value of 1) to the illustrative equation produces a series of values for the quantity $y$ as indicated by the following chart.

| $x$ | $y$ | $\Delta$ | $\Delta^2$ | $\Delta^3$ |
|---|---|---|---|---|
| 1 | 0 | | | |
| | | 4 | | |
| 2 | 4 | | 10 | |
| | | 14 | | 6 |
| 3 | 18 | | 16 | |
| | | 30 | | 6 |
| 4 | 48 | | 22 | |
| | | 52 | | 6 |
| 5 | 100 | | 28 | |
| | | 80 | | 6 |
| 6 | 180 | | 34 | |
| | | 114 | | |
| 7 | 294 | | | |

The above chart not only indicates independent values of x and dependent values y, but additionally indicates values of differences: $\Delta = (y_{n+1} - y_n)$; $\Delta^2 = (\Delta_{n+1} - \Delta_n)$; and $\Delta^3 = (\Delta^2_{n+1} - \Delta^2_n)$. As the illustrative equation is of the third order, the third difference $\Delta^3$ is constant, i.e., 6.

With the illustrative equation, $x^3 - x^2 = y$, the differences between the progressive values in the dependent variable ($y$) with uniform increments in the independent quantity ($x$) are subject to increasing differentials. Similarly, the differences between the previous differences are also subject to increasing differentials. However, the differences between the last differences, i.e., differences $\Delta^3$, are constant at 6. Accordingly, as an alternative to computing values for the dependent variable y by applying the equation on the basis of increments in the independent variable $x$, such values can be computed by adding differences. For example, in the above chart, the addition of the difference $\Delta^3$ i.e. 6 to the lesser value of the difference $\Delta^2$ and the addition of the result to a lesser value $\Delta$ results in a difference for determining the next incremental value of $y$ which would have resulted from a uniform increment in the independent variable $x$. Generally, the system hereof functions to compute specific values for plotting a curve or developing a surface by the use of this technique. Of course, the technique represented by a simple mathematical example above, may be expanded to various orders and to surfaces rather than line situations. The expansion to surfaces involves the operation of the cubic array register 50 (FIG. 5).

From the above, it is apparent that the computation of the next value of the dependent variable y in each incremental progression may be obtained by performing three additions in sequence. Thus, referring to FIG. 5, it may be seen that the desired unknown values for the dependent variable y may be developed in steps by operating on known quantities of $y$, $\Delta$, $\Delta^2$ and $\Delta^3$ whereby three additions are performed. The iterative control circuit 90 exploys an adder of the summing multiplier 44 with the array register 50 to accomplish the iterative process. The connections are complex in numbers; however, a single example is illustrative of all.

Figure 5:
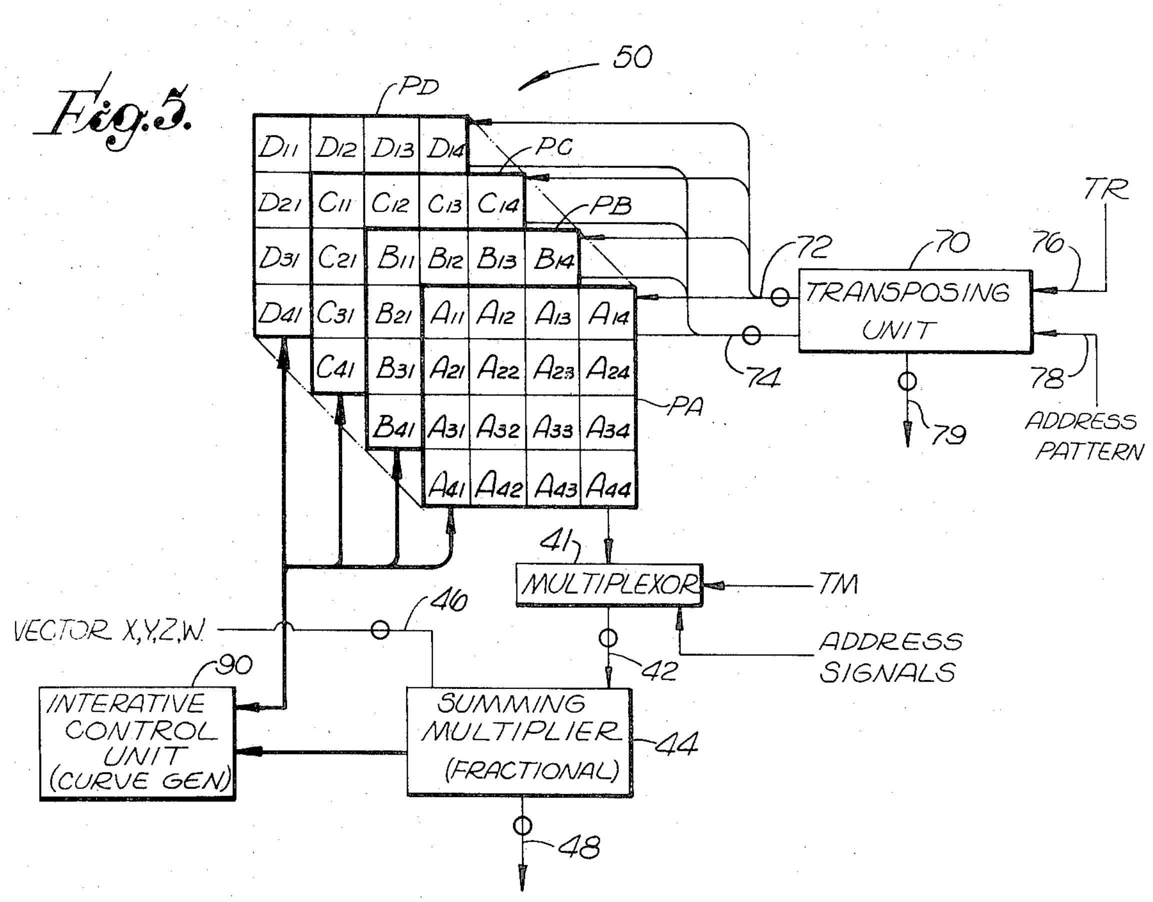
FIG. 5 is a block diagram illustrative of surface-multiplier aspect of the multiplier hereof as shown in FIG. 2.
Figure 6:
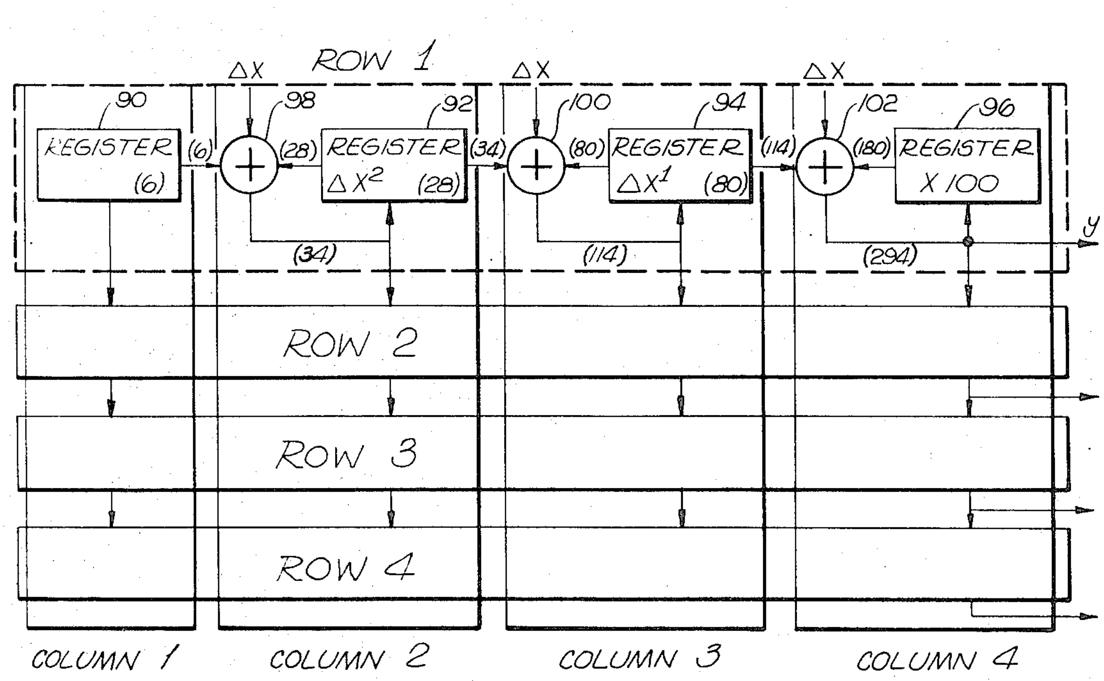
FIG. 6 is a block diagram illustrative of an iterative aspect of the multiplier as shown in FIG. 2.

Referring to FIG. 6, four registers 90, 92, 94 and 96 are represented and coincide to the four registers in the top row 1 in the plane PA of the cubic array 50 (FIG. 5). The rows and columns of the plane PA are generally indicated in FIG. 6. For the sake of simplicity in presentation, a number of separate adders are illustrated in FIG. 6; however, it is to be understood that a single adder of the multiplier 44 may be time shared or any of the apparent intermediate alternatives can be employed.

The registers 90 and 92 are connected to an adder 98, the output of which is returned to the register 92. Somewhat similarly, the registers 92 and 94 are connected to an adder 100, the output of which is returned to the register 94. In further similarity, the registers 94 and 96 are connected to an adder 102, the output of which is provided as an output signal representative of values for the dependent variable $y$ and is returned to the register 96.

Considering a numerical example as shown in the above chart to generate an incremental value of the dependent variable $y$, assume that the register 90 contains a value of 6 while the register 92 contains a value of 28, and the contents of register 94 is 80 while that of the register 96 is 180. These levels of value are underlined in the above chart, and are deemed to exist at a time when the independent variable $x$ is to be incremented from 6 to 7. Of course, it is to be appreciated that the registers 90, 92, 94 and 96 may be loaded directly from the computer unit 20 (FIG. 2) as illustrated in FIG. 3, to attain a particular set of initial conditions.

On the command to increment, by a timing signal $\Delta x$, the contents of the register 90 (6) is added to the contents of the register 92 (28) to obtain a value of 34 which is: (1) returned to the register 92 and (2) added with the contents of the register 94 (80) by the adder 100 to develop a value of 114. The value from the adder 100 is: (1) returned to the register 94 and (2) additively combined with a value of 180 by the adder 102 to produce a value of 294 which is the next incremental value of the dependent variable $y$. Thus, the system performs progressive additions to accomplish curves.

In the operation of the system to provide defined surfaces, the use of the single row of registers (Row 1 as shown in detail) is expanded to define a complete line. Specifically, the registers 90, 92, 94 and 96 of Row 1, as set forth in detail are duplicated, with interconnections in Rows 2, 3, and 4. Also, these row structures are duplicated in similar interconnected Columns 1, 2, 3, and 4 as indicated. Accordingly, a matrix plane of sixteen registers is interconnected by adders which function in timed sequence as explained above. A plurality of such planes are then provided as a cubic array as generally illustrated in FIG. 5. Thus, a group of y values can be provided which define lines, to in turn define surfaces. Specifically, just as the single Row 1 may operate as described above to generate a curve by a series of segments, a plane (comprising four columns, four rods or four rows) may be modified and to generate surfaces. That is, in the operation of the system as illustrated in FIG. 6, surfaces may be variously developed, as by working the individual registers along row configurations, along column configurations or along rod configurations, extending into the cubic array in the third dimension.

The flexibility of the illustrative multiplier system is further enhanced by structure for delivering elements of matrices as registered in the cubic array 50 (FIG. 5) in a manner so as to provide transformations. The specific apparent manipulations involved include the selective delivery of matrix elements as by going down either the rods, the columns or the rows of the cubic array 50; and the transposition or reflection of the matrix elements about diagonal planes therein. Essentially, output operations are involved for exchanging: rows for columns, columns for rods or rods for rows.

Referring to FIG. 5, a transposition unit 70 is indicated to be connected to the cubic array register 50 by cables 72 and 74. The transposing unit 70 is connected to the computer unit 20 to receive timing signals TR at an input 76 and a series of address signals, consisting of an address pattern, at an input 78. Functionally, the transposing unit provides signal-represented matrix elements to a cable 79, in various pre-arranged patterns as specified by applied address pattern signals received at the input 78 from the computer unit 20 (FIG. 2). It is to be recognized that the transposing unit 70 may include certain previously-described signal flow patterns; however, in the interests of simplicity and ease of disclosure, the transposing unit 70 is treated as a separate and distinct structure.

Figure 7:
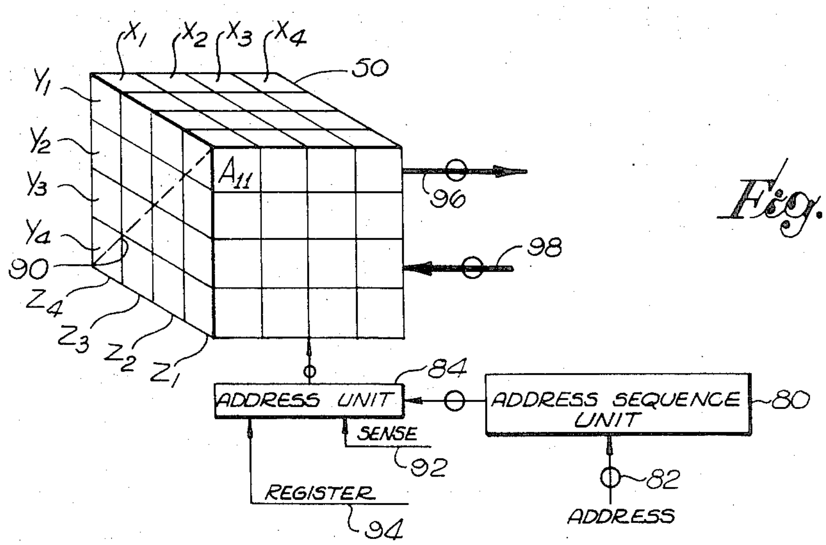
FIG. 7 is a block diagram of a transposing aspect of the multiplier as shown in FIG. 2.

The detailed operation of the transposing unit 70 will be considered with reference to the cubic array register 50 as shown in FIG. 7. As indicated above, the transposition may involve the designating registers to specify columns, rods or rows. Considering the cubic array register 50 (FIG. 7) it may be seen that the memory element $A_{11}$ registers a key element of a row $X_1$, a column $Y_1$ and a rod $Z_1$. If a matrix is specified from the plane PA, it will be provided element-by-element beginning with the row $X_1$ ($A_{11}, A_{12}, A_{13}, A_{14}$) followed by the row $X_2$ ($A_{21}, A_{22}, A_{23}, A_{24}$) in turn followed by rows $X_3$ ($A_{31}, A_{32}, A_{33}, A_{34}$) and $X_4$ ($A_{41}, A_{42}, A_{43}, A_{44}$) somewhat as described above. However, in accordance herewith, a matrix may also be specified on the basis of columns or rods in the cubic array register. Specifically, a matrix can be specified by columns $Y_1$, $Y_2$, $Y_3$ and $Y_4$ commanding elements as follows (in the adopted terminology):

$A_{11}, A_{21}, A_{31}, A_{41}$ $A_{12}, A_{22}, A_{32}, A_{42}$ $A_{13}, A_{23}, A_{33}, A_{43}$ $A_{14}, A_{24}, A_{34}, A_{44}$

In the adopted terminology, the elements B, C, and D appear in other planes. Thus, a matrix may also be specified by rods for delivery from the cubic array memory 50. Again in the adopted terminology such a matrix would be:

$A_{11}, B_{11}, C_{11}, D_{11}$ $A_{12}, B_{12}, C_{12}, D_{12}$ $A_{13}, B_{13}, C_{13}, D_{13}$ $A_{14}, B_{14}, C_{14}, D_{14}$

The examples above indicate that the four-by-four cubic array register 50 actually carries orderly arrangements of twelve sixteen-element matrices. Physically, the definition of these matrices may be pictured on the basis of slicing the cube progressively along its three dimensions. In accordance with dimensional convention, the twelve matrices are designated: $X_1$, $X_2$, $X_3$, $X_4$, $Y_1$, $Y_2$, $Y_3$, $Y_4$, $Z_1$, $Z_2$, $Z_3$ and $Z_4$, as indicated in FIG. 7. The matrices may be addressed by a simple four-bit binary code as follows:

| | |
|---|---|
| $X_1$ | 0001 |
| $X_2$ | 0010 |
| $X_3$ | 0011 |
| $X_4$ | 0100 |
| $Y_1$ | 0101 |
| $Y_2$ | 0110 |
| $Y_3$ | 0111 |
| $Y_4$ | 1000 |
| $Z_1$ | 1001 |
| $Z_2$ | 1010 |
| $Z_3$ | 1011 |
| $Z_4$ | 1100 |

In the operation of this aspect of the system, address signals, as designated by the above code, are applied (from the computer unit 20) to an address sequence unit 80 through an address cable 82. On receipt of such signals, the address sequence unit 80 provides a series of address signals to an address unit 84 specifying the locations of matrix elements in the cubic array register 50 to provide the selected matrix as indicated above. Elements are then either registered or sensed, depending upon the command supplied to the address unit 84.

Considering a specific example in detail, assume a desire to sense a matrix $Y_3$ from the cubic array register 50. Accordingly, signals representative of the code 0111 are applied to the address sequence unit 80 while the "sense" input 92 to the address unit 84 receives a high signal and the "register" input 94 receives a low signal. The code 0111 applied to the unit 80 results in a predetermined series of elemental addresses (registered or generated) to specify elements from the cubic array register 50 as follows:

$A_{31}\ A_{32}\ A_{33}\ A_{34}$ $B_{31}\ B_{32}\ B_{33}\ B_{34}$ $C_{31}\ C_{32}\ C_{33}\ C_{34}$ $D_{31}\ D_{32}\ D_{33}\ D_{34}$

Thus, the matrix $Y_3$, as specified, is provided, element-by-element, in signal represented form at an output cable 96 from the cubic array register 50. During registration operations, a similar sequence results in the registration of matrix elements received through an input cable 98. Accordingly, any orderly matrix may be specified in the cubic array register 50, which enables considerable flexibility in operation, particularly as related to the other structural aspects thereof as described above.

Of course, the various aspects hereof are important solely and cooperatively and consequently the system hereof is not to be interpreted by an analysis of the disclosed system but rather shall be determined by the claims as follows.

What is claimed is:

1. A matrix multiplier to process transformations for vectors of a predetermined number of dimensions $D$, comprising:

a matrix register for registering $[D + (1 \text{ or more})]$ by $[D + (1 \text{ or more})]$ matrices; and multiplication means connected for receiving a signal-represented matrix from said matrix register and for receiving a signal-represented one of said vectors, to multiply said signal-represented matrix with said signal-represented vector, to accomplish both transformations of translation and rotation.

2. A matrix multiplier according to claim 1 wherein said matrix register comprises a cubic array register for containing a plurality of said matrices.

3. A matrix multiplier according to claim 2 further including multiplexor means connected between said matrix register and said multiplication means for selectively providing signal-representative matrices from at least two planes as registered in said matrix register.

4. A matrix multiplier according to claim 2 further including means connected to said matrix register for transposing signal-representative matrices in said matrix register.

5. A matrix multiplier according to claim 2 further including concatenation multiplier means connected to said matrix register for providing signals representative of the products of two matrices to said multiplication means and means for registering such products in said matrix register.

6. A matrix multiplier according to claim 2 further including means connected to said matrix register for iteratively adding the contents of portions of said matrix register to provide signals to designate points along a generated curve.

7. A matrix multiplier for manipulating vector matrix components, comprising:

a matrix register including a plurality of planar registers, for registering plural matrices in a cubic array defining rows, elements and rods;

multiplier means connected to said matrix register to receive signal-represented matrix components therefrom to provide signal-represented products; and means for variously addressing said matrix register including means for effectively transposing matrix components within said matrix register between rods, rows and columns whereby to provide signal-represented matrix components registered in different portions of said matrix register to said multiplier means for combination with other signal-represented values by said multiplier means.

8. A matrix multiplier according to claim 7 wherein said means for variously addressing comprises means for selecting matrices from one plane elemental register in said cubic array.

9. A matrix multiplier according to claim 7 further including means for transferring matrix components to said multiplier means in an iterative pattern to define geometric patterns.

10. A matrix multiplier according to claim 7 wherein said matrix register registers transformation matrices of at least one degree greater than the degree of vectors whereby said multiplier means accomplishes both rotation and translation.

* * * * *

UNITED STATES PATENT OFFICE
CERTIFICATE OF CORRECTION

Patent No. 3,763,365 Dated October 2, 1973

Inventor(s) Charles L. Seitz

It is certified that error appears in the above-identified patent and that said Letters Patent are hereby corrected as shown below:

Column 2, line 65 "is" should be -- its --;

Column 3, line 36 "4+0 = 4" should be -- 4+0+4 --;

Column 4, line 25 "$a_{41}$ x" should be -- $a_{41}$ w --;

Column 6, line 40 after "display" should be -- code --; after "is" delete the comma;

Column 7, line 29 "6" should be -- $\underline{6}$ --;

Column 7, line 30 "28" should be -- $\underline{28}$ --;

Column 7, line 31 "80" should be -- $\underline{80}$ --;

Column 7, line 32 "180" should be -- $\underline{180}$ --;

Column 9, line 1 after "modified and" should be -- operate --.

Signed and sealed this 19th day of March 1974.

(SEAL)
Attest:

EDWARD M. FLETCHER, JR.
Attesting Officer

C. MARSHALL DANN
Commissioner of Patents

USCOMM-DC 60376-P69
★ U.S. GOVERNMENT PRINTING OFFICE : 1969 O—366-334.